US009360145B2

(12) United States Patent
Sorhuus et al.

(10) Patent No.: US 9,360,145 B2
(45) Date of Patent: Jun. 7, 2016

(54) POT HEAT EXCHANGER (75) Inventors: Anders Kenneth Sorhuus, Ski (NO); Geir Wedde, Oslo (NO); Odd Edgar Bjarno, Oslo (NO)

(73) Assignee: ALSTOM Technology Ltd, Baden (CH)

( * ) Notice: Subject to any disclaimer, the term of this patent is extended or adjusted under 35 U.S.C. 154(b) by 198 days.

(21) Appl. No.: 13/824,950

(22) PCT Filed: Sep. 1, 2011

(86) PCT No.: PCT/IB2011/002033
§ 371 (c)(1),
(2), (4) Date: Apr. 16, 2013

(87) PCT Pub. No.: WO2012/035391
PCT Pub. Date: Mar. 22, 2012

(65) Prior Publication Data
US 2013/0213494 A1 Aug. 22, 2013

(30) Foreign Application Priority Data

Sep. 17, 2010 (EP) .................................... 10177366

(51) Int. Cl.
*C25C 3/22* (2006.01)
*F16L 53/00* (2006.01)
(Continued)

(52) U.S. Cl.
CPC . *F16L 53/00* (2013.01); *C25C 3/22* (2013.01); *F27B 14/08* (2013.01); *F27D 17/001* (2013.01);
(Continued)

(58) Field of Classification Search
CPC .................................. C25C 3/22; C25D 7/005

USPC ................................... 205/391, 354; 204/247
See application file for complete search history.

(56) References Cited

U.S. PATENT DOCUMENTS 4,447,301 A * 5/1984 Shen .............................. 205/336

FOREIGN PATENT DOCUMENTS

CN 2303853 Y 1/1999
CN 2308610 Y 2/1999
(Continued)

OTHER PUBLICATIONS

Machine translation of DE 19845258, published Mar. 16, 2000.*
(Continued)

*Primary Examiner* — Nicholas A Smith
*Assistant Examiner* — Brian W Cohen
(74) *Attorney, Agent, or Firm* — Rita D. Vacca (57) ABSTRACT A raw gas collection system for collecting raw gas from a plurality of aluminum smelting pots is equipped with a plurality of branch ducts (28d), each of which is arranged to channel a respective branch flow (38d) of raw gas from an aluminum smelting pot to a collection duct (26A), which is common to and shared by the branch ducts (28d). Each of said branch ducts (28d) is, near an outlet (52d) thereof, equipped with a curved section (50d) for aligning the branch flow (38d) with a flow direction of raw gas (27A) already present in the common collection duct (26A), and a constriction (54d) for accelerating the branch flow (38d) through the branch duct outlet (52d) into the common collection duct (26A). Furthermore, each of said branch ducts (28d) is equipped with a heat exchanger (40d) for removing heat from the respective branch flow (38d) of raw gas. The combined flow resistance of the constriction (54d) and the heat exchanger (40d) reduces the need for adjusting the respective branch flows (28d) using dampers, thereby reducing the power required to transport the raw gas.

8 Claims, 4 Drawing Sheets (51) Int. Cl.
  *F27B 14/08* (2006.01)
  *F27D 17/00* (2006.01)
  *F28D 7/16* (2006.01)
  F28D 21/00 (2006.01)
  F28F 9/02 (2006.01)
  F28F 13/08 (2006.01)
  F28F 19/00 (2006.01)

(52) U.S. Cl.
  CPC ............ *F27D 17/004* (2013.01); *F28D 7/1615* (2013.01); *F28D 7/1653* (2013.01); *F28D 21/0003* (2013.01); *F28F 9/0282* (2013.01); *F28F 13/08* (2013.01); *F28F 19/00* (2013.01); *Y02P 10/262* (2015.11); *Y10T 137/6416* (2015.04)

(56) References Cited

FOREIGN PATENT DOCUMENTS

| | | |
|---|---|---|
| CN | 201309970 Y | 9/2009 |
| DE | 19845258 C1 | 3/2000 |
| EP | 0105442 A1 | 4/1984 |
| RU | 2218453 C1 | 12/2003 |
| RU | 2385975 C2 | 4/2010 |
| WO | 03001106 A1 | 1/2003 |
| WO | 2008113496 A1 | 9/2008 |

OTHER PUBLICATIONS

Geankoplis, C. J. "Transport Processes and Unit Operations" published in 1993, p. 84-85.*

International Search Report and Written Opinion, International Searching Authority, PCT Application No. PCT/IB2011/002033, European Searching Authority, Completed Jun. 19, 2012, Authorized Office Hammerstein, G.

European Search Report, European Searching Authority, EP Application No. 10177366, Search Completed Dec. 2, 2010, The Hague.
SIPO First Office Action dated Jan. 12, 2015 for Chinese Appln. No. 201180055198.8.

Decision of Grant issued from Russian Patent Office dated Dec. 21, 2015 for RU Application No. 2013117426.

* cited by examiner

POT HEAT EXCHANGER

This is a U.S. National Phase application claiming priority to International Application No. PCT/IB2011/002033 having an International Filing Date of Sep. 1, 2011, incorporated herein in its entirety by reference.

FIELD OF THE INVENTION

The present invention relates to a raw gas collection system for collecting raw gas from a plurality of aluminium smelting pots. The invention also relates to a method of moving a branch flow of raw gas from an aluminium smelting pot to a common collection duct.

BACKGROUND

Aluminium is often produced by means of an electrolysis process using one or more aluminium production electrolytic cells. Such electrolytic cells typically comprise a bath for containing bath contents comprising fluoride containing minerals on top of molten aluminium. The bath contents are in contact with cathode electrode blocks and anode electrode blocks. Aluminium oxide is supplied on regular intervals to the bath via openings at several positions along the center of the cell and between rows of anodes.

The electrolytic reaction taking place in the electrolytic cells generates a hot effluent gas that comprises gaseous components that are undesirable in the atmosphere, including hydrogen fluoride, sulphur dioxide, and the like. The process also generates fine dust. The undesirable gaseous components and dust must be disposed of in an environmentally conscientious manner; hence, the raw gas is collected at the electrolytic cells and transported to a gas cleaning unit, where any undesirable components are preferably removed as efficiently as possible. Dust and gaseous components such as hydrogen fluoride may be returned to the aluminium production cells, where they may be of benefit to the production process.

A typical gas cleaning unit may comprise a dry scrubber and a dust filter, e.g. a fabric filter that may be of the bag filter type. A raw gas collection system is typically arranged for collecting raw gas from a plurality of electrolytic cells, and transporting the raw gas to the cleaning unit. A consideration of such systems is that energy-consuming fans are often necessary in flue gas treatment systems to actively draw the raw gas from the electrolytic cells and through the gas cleaning unit. Such is the case since the raw gas collection ducts and the gas cleaning unit may introduce flow resistance in the flue gas collection and cleaning systems.

WO 03/001106 discloses a duct system for transporting raw process gas from a plurality of individually located aluminium smelting pots to a central gas filtering plant. WO 03/001106 addresses the energy consumption of gas transport by providing each branch duct, where it opens into the common collection duct, with a narrowing outlet section that is parallel to the common collection duct gas flow, so as to discharge the branch gas flow into the common collection duct at a speed that is higher than the speed of a gas flow in the common collection duct. Thereby, less energy is required for transporting the gas. There is however a need for even further reducing the amount of energy required for transporting raw gas.

SUMMARY

According to aspects illustrated herein, the above drawbacks and deficiencies of the prior art are at least partially overcome or alleviated by the subject raw gas collection system for collecting raw gas from a plurality of aluminium smelting pots. The subject raw gas collection system comprises a common collection duct for passage of a common collection duct flow of raw gas in a common collection duct flow direction; and a plurality of branch ducts, each of said branch ducts having an inlet fluidly connected to a smelting pot for drawing a respective branch flow of raw gas therefrom, and a discharge end fluidly connected to the common collection duct. The discharge ends of the branch ducts are each equipped with an alignment section for directing the direction of the branch flow with that of said common collection duct flow, a discharge aperture, and a constriction for accelerating the branch flow through the discharge aperture into the common collection duct. Each of at least two branch ducts of said plurality of branch ducts is also equipped with a heat exchanger. Each of said heat exchangers is equipped with a heat transfer element located in the flow path of the respective branch flow, for transferring heat from the respective branch flow of raw gas to a heat transfer medium, and for generating a flow resistance in the respective branch duct. Such flow resistance serves to balance the velocity of the branch flows of the at least two branch ducts. Each heat exchanger is associated with a flow resistance, and hence induces a pressure drop thereacross. The same applies to the constrictions in each of the discharge ends. The pressure drop across each of the heat exchangers operates, in combination with the pressure drop across each of the constrictions, so as to more uniformly balance the branch flow rates/velocities between the at least two branch ducts. Thereby, more predictable process conditions may be obtained in the respective smelting pots, since the supply of alumina to the smelting pots, as well as the aluminium production process as such, depend on e.g. the composition and flow of gas inside the smelting pots, and on the temperature and pressure of said gas. Furthermore, a constriction and a heat transfer element in each branch duct increases the branch duct flow resistance, thus reducing the need for e.g. branch duct regulation dampers. Duct regulation dampers are often used to regulate pressure along the common collection duct so as to achieve a more consistent/uniform pressure therein. Reducing the need for duct regulation dampers reduces the total energy consumption of the raw gas collection system.

According to an embodiment, the heat exchanger and constriction within each of said at least two branch ducts are configured to, when in use, together generate at least 50% of a total raw gas pressure drop from the respective branch duct inlet to the respective discharge aperture. Such results in an even more uniform balancing of branch flows between the branch ducts. Furthermore, the greater the pressure drop generated by components having an additional function, such as exchanging heat or accelerating gas, the less energy is required to move the gas through the system. By creating pressure drops using such "double function" components in the at least two branch ducts, i.e. between the inlets and the discharge apertures of the respective branch ducts, "sole function" pressure drop generating components, such as dampers, may be eliminated from the system.

According to an embodiment, the constriction in each of said at least two branch ducts is provided with an adjustable flap for controlling the acceleration of the respective branch flow into the common collection duct. Such increases the effectiveness of the acceleration, while reducing the need for an additional regulation damper in the branch duct for fine-tuning flow resistance within the branch duct.

According to an embodiment, the heat transfer element of each of said at least two branch ducts is located at the discharge aperture. Thereby, the constriction for accelerating the raw gas is formed by the heat transfer element itself. The kinetic energy of the gas in the heat exchanger will thereby be better preserved on entry into the common collection duct.

According to an embodiment, at least one of said at least two branch ducts is provided with a regulation damper for fine-tuning flow resistance within the respective branch duct. The flow rates of the respective branch flows can thereby be adjusted with a greater accuracy.

According to an embodiment, said at least two branch ducts comprise at least 30% of all branch ducts fluidly connected to said common collection duct. By providing a significant number of branch ducts with heat exchangers, more uniform raw gas flow rates from each of the branch ducts associated with the common collection duct may be obtained. Furthermore, if a significant number of branch ducts are equipped with heat exchangers, a balancing effect on the raw gas flow rates in the different branch ducts results to somewhat equalize the raw gas flow rates through any branch ducts without heat exchangers.

According to an embodiment, said at least two branch ducts with heat exchangers are fluidly connected to the common collection duct downstream, with regard to the flow of gas, of a plurality of branch ducts not equipped with heat exchangers. This is the most effective location of branch ducts with heat exchangers/increased flow resistance, since the raw gas flowing from the branch ducts not equipped with heat exchangers, i.e., without the associated added flow resistance, naturally undergoes a pressure drop due to the relatively longer distance required to flow through the common collection duct.

According to an embodiment, heat exchangers in said at least two branch ducts comprise respective raw gas inlet chambers for receiving branch flows of raw gas, and respective pluralities of parallel, spaced apart raw gas cooling tubes. Such heat exchangers are commercially desirable due to low levels of internal scaling and low overall system energy loss, even with the flow resistance caused thereby. Accordingly, one may achieve low overall system energy loss, while still maintaining a sufficient pressure drop to balance respective branch flow rates of raw gas. According to an embodiment, each raw gas cooling tube has a cooling tube inlet funnel for accelerating the velocity of raw gas flowing into the cooling tube. The inlet funnels may reduce scaling and may be better adapted for the "double purpose" of raw gas flow resistance.

According to other aspects disclosed herein, the above-noted drawbacks and deficiencies of the prior art are substantially overcome or alleviated by a method of moving a branch flow of raw gas from an aluminium smelting pot to a common collection duct. The subject method comprises cooling said branch flow of raw gas in a heat exchanger, so as to obtain cooled raw gas. The velocity of the branch flow of raw gas is accelerated as it enters the common collection duct in a direction of flow the same as or aligned with the direction of flow of raw gas already flowing through the common collection duct.

According to an embodiment, said heat exchanger accelerates the velocity of raw gas branch flow as it enters into the common collection duct.

According to an embodiment, said method is performed at each of a plurality of smelting pots along the common collection duct.

According to yet other aspects disclosed herein, the above-noted drawbacks and deficiencies of the prior art are substantially overcome or alleviated by the use of a heat exchanger for accelerating the velocity of a branch flow of raw gas from an aluminium smelting pot into a common collection duct. Thereby, less energy is consumed/required to collect raw gas.

According to still further aspects disclosed herein, the above-noted drawbacks and deficiencies of the prior art are substantially overcome or alleviated by the use of a plurality of flow resistance generating heat exchangers for balancing a plurality of branch flows in a respective plurality of branch ducts. Each of said branch ducts is arranged between a respective aluminium smelting pot and a common collection duct. Thereby, the individual branch flows of said plurality of branch flows may have raw gas velocities that are more uniform or balanced, and/or less energy may be consumed for raw gas collection.

BRIEF DESCRIPTION OF THE DRAWINGS

The above, as well as additional objects, features and advantages, will be better understood through the following illustrative and non-limiting detailed description of exemplary embodiments, with reference to the appended drawings in which like elements are numbered alike, wherein.

DETAILED DESCRIPTION OF THE EXEMPLARY EMBODIMENTS

Figure 1:
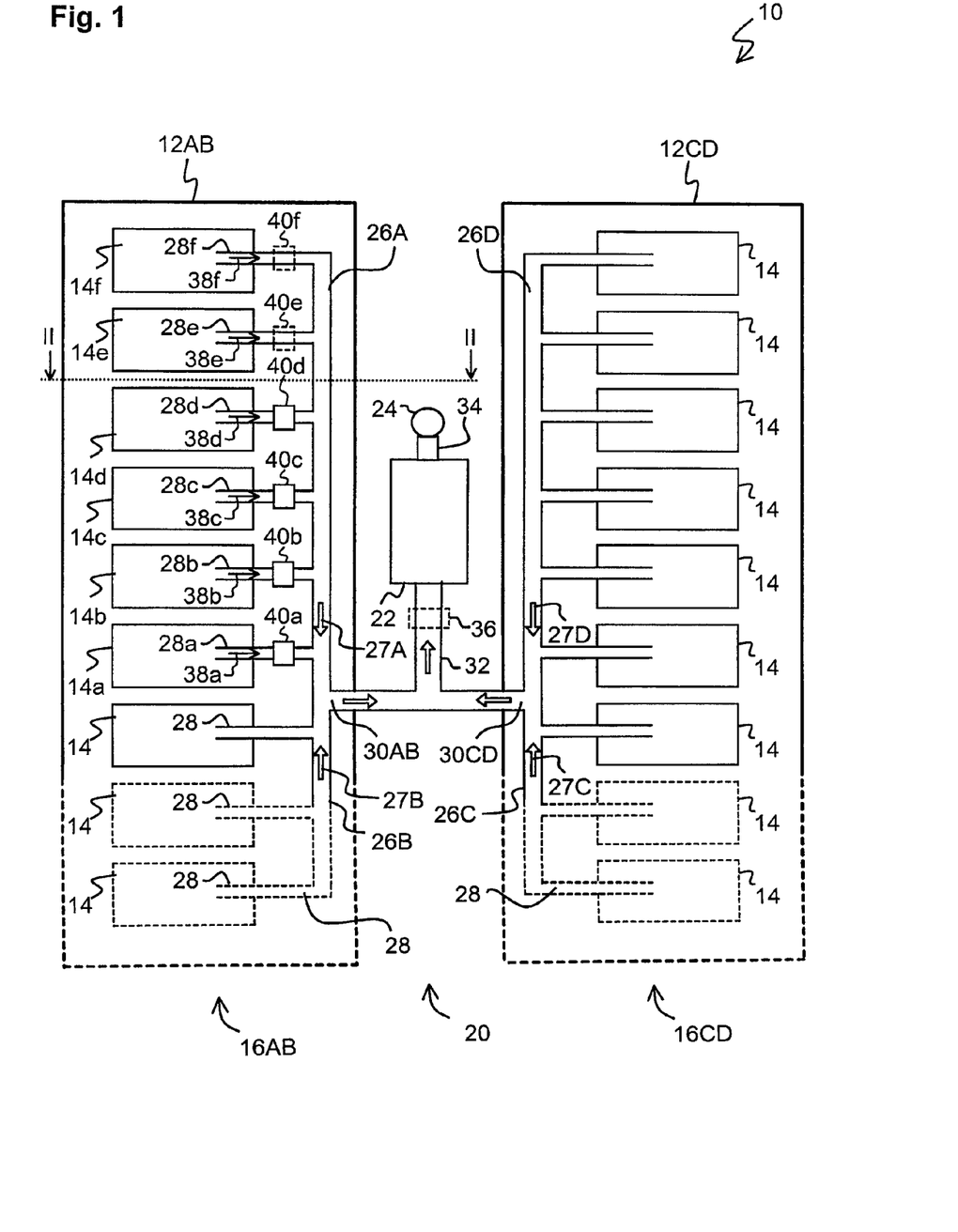
FIG. 1 is a diagrammatic top plan view of an aluminium production plant.

FIG. 1 is a schematic representation of an aluminium production plant 10 as seen from above. The aluminium production plant 10 comprises a plurality of electrolytic cell rooms, or pot rooms 12AB, 12CD, each comprising a number of aluminium production smelting pots, or electrolytic cells, 14. The electrolytic cells 14 are arranged in potlines in the manner well known to those skilled in the art. A potline comprises a plurality of electrolytic cells, connected in series in a direct current (DC) loop. FIG. 1 illustrates a first and a second electrolytic cell room 12AB, 12CD, with each room housing a respective potline 16AB, 16CD. Even though a single potline 16AB, 16CD in FIG. 1 is illustrated as housed in a single electrolytic cell room 12AB, 12CD, a single potline 16, defined as a plurality of smelting pots that are electrically connected in series, may just as well stretch across several electrolytic cell rooms 12. By way of example, as an alternative to the configuration described above, electrolytic cells 14 of a potline 16AB could be electrically connected in series with the electrolytic cells 14 of a second potline 16CD, so as to form a single, twice as long potline including both 16AB and 16CD, located in two separate pot rooms 12AB and 12CD.

Even though the aluminium production plant 10 of FIG. 1 is provided with two potlines 16AB, 16CD, an aluminium production plant 10 may typically comprise from 1 to 20 potlines 16 located in typically from 1 to 20 pot rooms 12. And even though only a few electrolytic cells 14 are illustrated in each potline 16AB, 16CD of FIG. 1, a single potline 16 may typically comprise from 50 to 200 electrolytic cells 14. The dashed lines of FIG. 1 indicate that each of the electrolytic cell rooms 12AB, 12CD may comprise a number of additional electrolytic cells 14, and that the plant 10 may comprise additional potlines and/or electrolytic cell rooms.

The process occurring in the electrolytic cells 14 may be the well-known Hall-Héroult process, in which aluminium oxide dissolved in a melt of fluorine containing minerals, is electrolysed to form aluminium. Hence, the electrolytic cells 14 function as electrolysis cells. Powdered aluminium oxide is fed to the electrolytic cells 14 via an alumina distribution system (not shown) in a manner well known to those skilled in the art.

The electrolysis process occurring in each electrolytic cell 14 generates large amounts of heat, dust particles and effluent gases, including but not limited to hydrogen fluoride, sulphur dioxide and carbon dioxide. In this disclosure, the term raw gas denotes uncleaned gas from an industrial process, such as the hot flue gas from an electrolytic smelting pot 14. A raw gas collection system 20 is configured to collect and transport the raw gas from a plurality of electrolytic cells 14 to a gas cleaning unit 22, which cleans the raw gas such that it can safely be released to the atmosphere via a smokestack 24. Often, fresh alumina is used in the gas cleaning unit 22 for dry scrubbing of the raw gas.

Typically, a raw gas collection system 20 is configured to collect raw gas from one or two pot rooms 12AB, 12CD, and a gas cleaning unit 22 is often connected between a mirrored pair of pot rooms 12AB, 12CD according to the well-known "H" configuration illustrated in FIG. 1. However, even though pot rooms 12AB, 12CD are illustrated in FIG. 1 as being connected to a single gas cleaning unit 22, each single pot room 12AB, 12CD may be connected to multiple gas cleaning units 22.

For each pot room 12AB, 12CD served by a raw gas collection system 20, the raw gas collection system 20 comprises at least one common collection duct, which acts as a manifold for collecting the raw gas generated by a plurality of smelting pots 14. In the example illustrated in FIG. 1, each of the pot rooms 12AB, 12CD is provided with a respective first common collection duct 26A, 26D, and a respective second common collection duct 26B, 26C. Each set of a first and a second common collection ducts thereby form a pair of common collection ducts. By way of example, a first pair of common collection ducts 26A, 26B is provided at the first pot room 12AB; and a second pair of common collection ducts 26C, 26D is provided at the second pot room 12CD. Each of the common collection ducts 26A-D may be located inside and/or outside the respective pot rooms 12AB, 12CD. Each common collection duct 26A-D extends along a portion of its respective pot room 12AB, 12CD, and is fluidly connected to a plurality of electrolytic cells 14 via a respective plurality of branch ducts 28. A respective common collection duct flow 27A-D of raw gas flows in each respective common collection duct 26A-D, from the respective plurality of smelting pots 14 toward gas cleaning unit 22. By way of example, a first common collection duct 26A is fluidly connected to the interior of each of a first plurality of electrolytic cells 14a-f of the pot room 12AB via a number of respective branch ducts 28a-f, and draws a first common collection duct flow 27A of raw gas. The first plurality of electrolytic cells 14a-f are positioned in parallel and fluidly connect to first common collection duct 26A in parallel. Each branch duct 28a-f has a discharge end, which will be described in greater detail with reference to FIG. 3, through which branch flows 38a-f flow from the respective branch ducts 28a-f into the common collection duct 26A.

The second collection duct 26B of the first pair of common collection ducts 26A-B is connected to a second plurality of electrolytic cells 14 in first pot room 12AB in a manner similar to that of first collection duct 26A, i.e., via branch ducts 28. The second pair of common collection ducts 26C-D of second pot room 12CD, is arranged in a similar manner to that of common collection ducts 26A-B of first pot room 12AB, mutatis mutandis.

Each pair of common collection ducts 26A-B, 26C-D, are joined and fluidly connect to a respective common collection duct outlet 30AB, 30CD. Common collection duct flows 27A-B, 27C-D of raw gas flow through respective common collection duct outlets 30AB and 30CD toward gas cleaning unit 22. By way of example, the two common collection ducts 26A, 26B associated with the first pot room 12AB, join and fluidly connect at a first common collection duct outlet 30AB, through which a first and a second common collection duct flow 27A-B of raw gas flow. Similarly, the first and second collection ducts 26C-D join and fluidly connect at a second common collection duct outlet 30CD.

Each common collection duct 26A-D channels its respective common collection duct flow 27A-D of raw gas in a common collection duct flow direction toward gas cleaning unit 22. Such direction of raw gas flow is illustrated in FIG. 1 by arrows within each of the common collection ducts 26A-D. The four common collection duct flows 27A-D converge in a T-shaped header duct 32, through which the raw gas enters gas cleaning unit 22.

The raw gas collection system 20 operates by under-pressure, created by a fan 34 located downstream, with regard to gas flow, of gas cleaning unit 22. Hence, the fan downstream with regard to gas flow from raw gas collection system 20 actively draws raw gas from electrolytic cells 14, via branch ducts 28, common collection ducts 26A-D, and T-shaped header duct 32, into gas cleaning unit 22. All smelting pots 14, the entire raw gas collection system 20, and the gas cleaning unit 22, are upstream, with regard to gas flow, of the fan 34, and are maintained at an underpressure, as compared to atmospheric pressure, when plant 10 is in use. Such underpressure serves to keep raw gas from leaking from the smelting pots 14 into pot rooms 12AB, 12CD.

In order to improve the cleaning efficiency of gas cleaning unit 22, it is known in the art to provide a header duct 32 with a heat exchanger 36 immediately upstream of gas cleaning unit 22. Such a prior art heat exchanger 36 placement is illustrated by dashed lines in FIG. 1. In such a case, raw gas is cooled in heat exchanger 36 prior to it entering gas cleaning unit 22. An example of a heat exchanger 36 particularly resistant to scaling is disclosed in WO 2008/113496. The heat exchanger 36 may also be provided with input and output dampers, so as to make it possible to isolate heat exchanger 36 for service and maintenance, or to switch over to a back-up heat exchanger as the case may be.

Each of the ducts and components contacting the raw gas as it flows from electrolytic cells 14 to smokestack 24 imparts a gas flow resistance, which may also be represented by a pressure drop. A pressure drop corresponds to an energy loss, which has to be accommodated for by providing a sufficient draw from fan 34. The pressure is the lowest just upstream of the fan 34, and increases along the gas flow path in a direction opposite to that of gas flow. The highest pressure, least amount of draw from the fan, is in the most remote electrolytic cell 14f as illustrated in FIG. 1. Hence, the pressure varies throughout the system including along common collection ducts 26A-D. By way of example, the pressure in the first common collection duct 26A is the lowest at the first common collection duct outlet 30AB and the highest at the most remote end of the common collection duct 26A, at branch duct 28f.

The four common collection ducts 26A-D may be of similar design and function. Hence, for reasons of clarity, only the first common collection duct 26A, and the first plurality of smelting pots 14a-f connected thereto, will be described in the following. It will be appreciated that the other three common collecting ducts 26B-D are equipped and function like common collection duct 26A.

Referring now to first common collecting duct 26A, and the first plurality of smelting pots 14a-f fluidly connected thereto via branch ducts 28a-f, each of the smelting pots 14a-f generates raw gas. Flowing raw gas illustrated as arrows to depict branch flows 38a-f, moves through respective branch ducts 28a-f to common collection duct 26A. Each of the branch ducts 28a-f is provided with a respective heat exchanger 40a-f in order to cool the respective branch flows 38a-f. By locating heat exchangers 40a-f in the branch ducts 28a-f, any heat exchanger 36, and dampers associated therewith, positioned in header duct 32, may be eliminated. Each of the heat exchangers 40a-f introduces a flow resistance, and hence also a pressure drop. Thereby, heat exchangers 40a-f located in respective branch ducts 28a-f have an equalizing effect on the relative flow rates/velocities of the individual branch flows 38a-f. Such may be easier understood considering that the pressure drop across an individual heat exchanger 40a-f represents a minimum total pressure drop across the entire branch flow path consisting of the heat exchangers 40a-f plus their respective branch ducts 28a-f. By way of example, as an extreme special case for illustrating the principle, the following description is provided. Should the underpressure of a single, first smelting pot 14a be completely lost, e.g. due to a severe gas leak in branch duct 28a upstream, with regard to gas flow, of heat exchanger 40a, the flow resistance of heat exchanger 40a operates to maintain an underpressure downstream, with regard to gas flow, of heat exchanger 40a. Such flow resistance of heat exchanger 40a ensures that enough raw gas will still be drawn from the other pots 14b-f, even with the described severe gas leak. On the other hand, if no heat exchangers 40a-f were present in branch ducts 28a-f, in the case of the described severe gas leak, fan 34 would draw much more raw gas from branch duct 28a, due to its loss of flow resistance as a result of the leak, while the flow rates through non-damaged branch ducts 28b-f would decrease significantly.

In a similar manner, heat exchangers 40a-f operate to more evenly balance individual branch flows 38a-f velocities of raw gas from the electrolytic cells 14a-f, also under normal operating conditions. In particular, the plurality of heat exchangers 40a-f operate to relatively equalize pressure levels in common collection duct 26A. Such equalization reduces the pressure drop from the discharge end of the most remote branch duct 28f to the discharge end of the nearest branch duct 28a, with respect to the common collection duct outlet 30AB. The heat exchangers 40a-f hence have an equalizing or levelling effect on the pressure along the common collection duct 26A, and hence the flow rates of the respective branch flows 28a-f, even if the flow resistance is identical in each of the heat exchangers 40a-f. More predictable process conditions in the smelting pots 14a-f may thereby be obtained, which may result in more efficient aluminium production. Furthermore, the risk of leaking raw gas from the smelting pots 14a-f to the atmosphere inside pot room 12AB is reduced, since a more stable ventilation of the smelting pots 14a-f may be obtained.

It is not necessary that the branch flows 28a-f become exactly equal due to the presence of heat exchangers 40a-f. In this disclosure, the terms "balancing", "equalizing", "levelling" or the like means to reduce any difference between respective magnitudes, but not necessarily eliminating all difference therebetween.

Even though each of the individual heat exchangers 40a-f introduce a pressure drop in the respective branch ducts 28a-f, the total pressure drop in the system may be lowered as compared to having a single heat exchanger 36 in header duct 32. The reason for this is that each branch duct of at least a first set of branch ducts 28a-d, i.e., those branch ducts closest to the common collection duct outlet 30AB, would otherwise each require a respective damper for levelling pressure along common collection duct 26A, such that the branch flows 38a-f become relatively balanced. Placing individual heat exchangers 40a-f in each branch duct 28a-f renders dampers superfluous, such that they may be dispensed with or kept in an open state if already present in the system. In other words, by creating a pressure drop where a pressure drop is naturally needed using heat exchangers 40a-f, two system requirements are met using one system component, i.e., heat exchangers 40a-f. Hence, heat exchangers 40a-f fulfill two system requirements: a pressure drop and heat removal from raw gas. Using a damper to generate such a pressure drop where the pressure drop is needed, still requires the use of a heat exchanger 36, e.g. in the header duct 32, to remove heat from raw gas. Heat exchanger 36 thus generates an additional pressure drop in header duct 32, where a pressure drop is not needed.

Heat exchangers 40a-f not only operate to balance individual branch flows 38a-f flowing into common collection duct 26A, but also balance the flow rate of common collection duct flow 27A with common collection duct flows 27B-D in common collection ducts 26B-D, provided that branch ducts 28 connected to those common collection ducts are also equipped with heat exchangers 40.

As an alternative to providing all branch ducts 28a-f of common collection duct 26A with heat exchangers 40a-f, it would be possible to provide only a first set of branch ducts 28a-d with respective heat exchangers 38a-d, and leave a second set of branch ducts 28e-f without heat exchangers.

In such a case, branch ducts 28e-f of the second set could be provided with dampers for generating a pressure drop, or they could be free from dampers and heat exchangers so as to allow free flow therethrough. The latter is particularly attractive in a configuration where the branch ducts 28e-f of the second set are located farther away from common collection duct outlet 30AB than branch ducts 28a-d of the first set. Thereby, the pressure drop along common collection duct 26A from the branch ducts 28e-f of the second set, will somewhat compensate for the pressure drop of heat exchangers 40a-d of branch ducts 28a-d of the first set.

Figure 2:
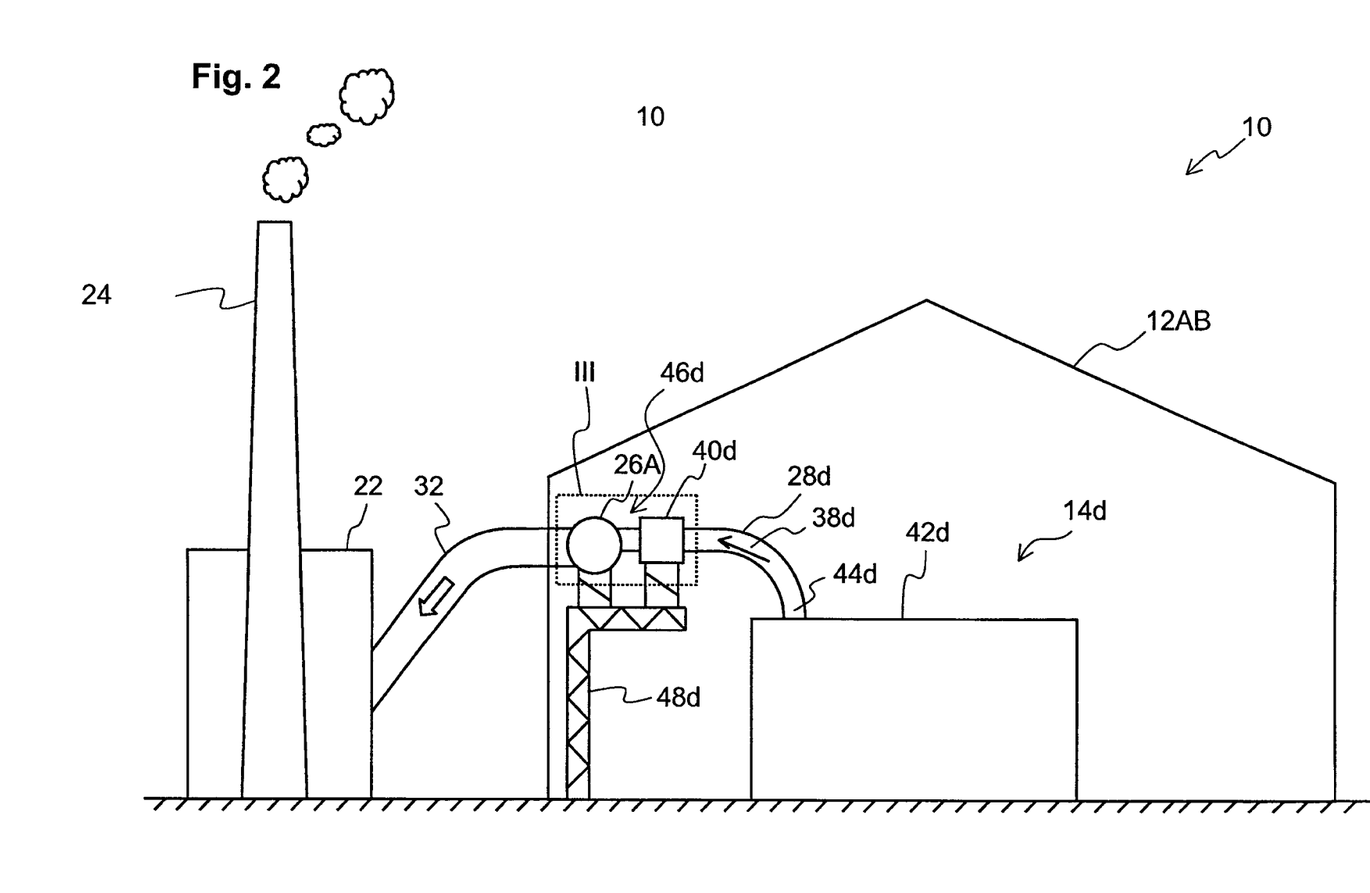
FIG. 2 is a schematic cross-section side view, taken along line II-II, of the aluminium production plant of FIG. 1.

FIG. 2 is a schematic side view representation of the pot room 12AB taken in cross section along line II-II of FIG. 1 viewing toward smokestack 24. In FIG. 2, only one smelting pot 14d is illustrated, even though each of the other smelting pots 14a-c, 14e-f are connected to common collection duct 26A in a similar manner. Therefore, for reasons of simplicity and clarity, only smelting pot 14d, its arrangement in pot room 12AB, and its connection to common collection duct 26A will be described in detail. It will be appreciated that the subject description may apply to the entire first set of smelting pots 14a-c, and to the second set of smelting pots e-f, as the case may be.

A gas collecting hood 42d is arranged over smelting pot 14d, such that any raw gas emission from electrolytic cell 14d is collected so leakage into pot room 12AB is minimized. An inlet 44*d* of the branch duct 28*d* is fluidly connected to gas collecting hood 42*d* to draw raw gas from smelting pot 14*d* and obtain branch flow 38*d* of raw gas. A discharge end 46*d* of branch duct 28*d* is arranged to discharge branch flow 38*d* into fluidly connected common collection duct 26A. Heat exchanger 40*d*, arranged in branch duct 28*d*, shares a support structure 48*d* with common collection duct 26A.

Figure 3:
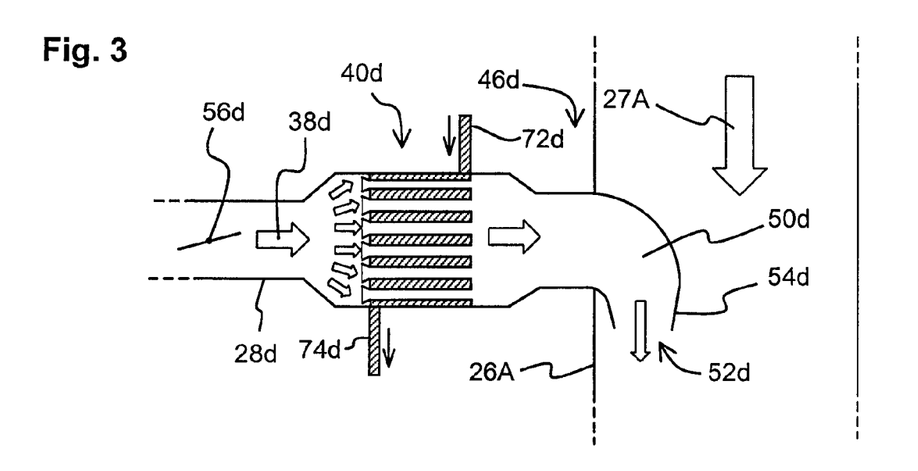
FIG. 3 is a schematic cross-section top view, of the discharge end of the branch duct illustrated in FIG. 2.

A magnified top view of the area within dotted rectangle III of FIG. 2, is illustrated in greater detail in FIG. 3.

FIG. 3 illustrates the discharge of branch flow 38*d* into common collection duct 26A. Discharge end 46*d* of branch duct 28*d* is provided with an alignment section 50*d*, which aligns the movement of branch flow 38*d* in the same direction as that of common collection duct raw gas flow 27A in common collection duct 26A. Discharge end 46*d* is also equipped with a discharge aperture 52*d* for discharging the aligned branch flow into the interior of common collection duct 26A, and a constriction 54*d* for accelerating branch flow 38*d* through discharge aperture 52*d* into common collection duct 26A. By accelerating branch flow 38*d* in constriction 54*d*, the increased speed of branch flow 38*d* has a positive effect increasing the speed of common collection duct raw gas flow 27A in common collection duct 26A. Thereby, energy consumption by fan 34 (FIG. 1) may be reduced. Furthermore, the pressure drop generated by constriction 54*d* operates to level branch flows 38*a-f* (FIG. 1). Preferably, branch flow 38*d* velocity is accelerated to a rate higher than that of the common collection duct raw gas flow 27A, such that discharged branch flow 38*d* pushes common collection duct raw gas flow 27A downstream. Even though discharge aperture 52*d* is illustrated in FIG. 3 as being arranged for discharging branch flow 38*d* in the same direction as that of common collection duct raw gas flow 27A, the alignment of branch flow 38*d* with common collection duct raw gas flow 27A by means of alignment section 50*d* need not be exact. Any change of direction of branch flow 38*d* toward the flow direction of common collection duct raw gas flow 27A is, for the purpose of this disclosure, to be regarded as an alignment. According to an embodiment, discharge end 46*d* is adapted to discharge branch flow 38*d* at an angle, with respect to the direction of flow of common collection duct raw gas flow 27A, of less than 45°.

Heat exchanger 40*d* comprises a plurality of heat transfer elements 68*d*, which will be described in greater detail with reference to FIG. 4. The heat transfer elements 68*d* are located in the flow path of branch flow 38*d*, such that heat exchanger 40*d* generates a flow resistance, and, when the plant 10 is in use, a pressure drop associated with that flow resistance. Heat transfer elements 68*d* also provide for a transfer of heat from branch flow 38*d* to a coolant, which may flow through the heat exchanger 40*d* from a coolant inlet 72*d* to a coolant outlet 74*d*.

By providing each of at least two branch ducts 28*a-d* with a respective heat exchanger 40*a-d* and a respective discharge end 46*a-d* of this type, the combined pressure drop across the respective heat exchangers 40*a-d* and the respective constrictions 54*a-d* results in a lower pressure drop along the common collection duct 26A, from the most remote smelting pot 14*f* to the first common collection duct outlet 30AB. Likewise, such achieves a more well-balanced distribution of the flow of raw gas between all individual branch flows 38*a-f*. Furthermore, each pressure drop generated by either heat exchanger 40*d* or constriction 54*d* results in an additional benefit, apart from generating a pressure drop, such as the exchange of heat with a coolant, or increasing the speed of the common collection duct flow of raw gas in the common collection duct 26A. Thereby, the number of flow resistance generating components, such as dampers, that have no function other than generating a pressure drop, may be reduced. This may result in a reduction of total energy consumption by fan 34, as described above.

Branch duct 28*d* may also be provided with a flow regulation damper 56*d* located upstream, with regard to the flow of gas, of heat exchanger 40*d*, for fine-tuning the flow resistance in branch duct 28*d*. Flow regulation damper 56*d* may also be used to individually isolate electrolytic cell 14*d*, in the event electrolytic cell 14*d* is in need of service. A similar damper (not shown) may also be arranged in branch duct 28*d* downstream, with respect to the flow of gas, of the heat exchanger 40*d* so heat exchanger 40*d* may likewise be isolated for service.

Figure 4:
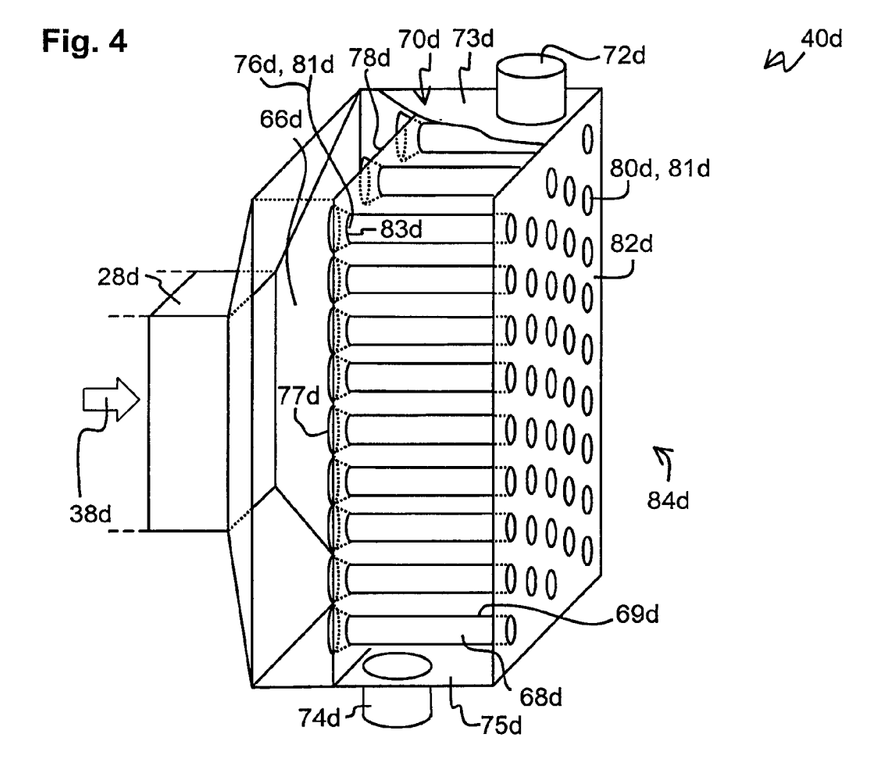
FIG. 4 is a schematic perspective view of a heat exchanger.

Turning now to FIG. 4, heat exchanger 40*d* comprises a raw gas inlet chamber 66*d* for receiving branch flow 38*d* from branch duct 28*d*, and a plurality of mutually parallel, spaced apart, raw gas cooling tubes 68*d*. Cooling tubes 68*d* are housed in a coolant housing 70*d*. Coolant housing 70*d* forms a fluid-tight compartment around the plurality of cooling tubes 68*d*, thereby allowing a fluid coolant, such as water, to be in direct thermal contact with the exterior surface 69*d* of cooling tubes 68*d*. Thereby, cooling tubes 68*d* act as heat transfer elements. For purposes of clarity, heat exchanger 40*d* of FIG. 4 is illustrated with parts of coolant housing 70*d* "broken away". For the same purpose, heat exchanger 40*d* is illustrated as having only about 40 cooling tubes 68*d*. However, according to an embodiment, each heat exchanger 40*d* may, by way of example, be equipped with between 100 and 3000 cooling tubes 68*d* in order to generate a suitable balance between flow resistance and heat exchange efficiency. More typically, each heat exchanger 40*d* may be equipped with between 100 and 600 cooling tubes 68*d*. Cooling tubes 68*d* may, by way of example, have a length of e.g. between about 80 and 200 cm (centimetres), and a diameter of e.g. between about 12 and 55 mm (millimetres). More typically, cooling tubes 68*d* may have a diameter of between 20 and 30 mm. Steel is a suitable material for the tubes. Heat exchanger 40*d* may, according to an embodiment, be configured to generate a pressure drop of between 100 Pa (Pascal) and 800 Pa when in use.

Coolant flows into heat exchanger 40*d* via a coolant inlet 72*d* provided in an upper wall 73*d* of coolant housing 70*d*, and flows from heat exchanger 40*d* via a coolant outlet 74*d*, provided in a lower wall 75*d* of coolant housing 70*d*. According to an embodiment, wall 73*d* and wall 75*d* are opposed. Heat transferred to the coolant in heat exchanger 40*d* may be used elsewhere where heat may be needed, such as for heating buildings, desalinating sea water, or the like.

An inlet 76*d* of each cooling tube 68*d* is fixedly connected to a cooling tube inlet plate 78*d*, which forms part of coolant housing 70*d*. An outlet 80*d* of each cooling tube 68*d* is fixedly connected to a cooling tube outlet plate 82*d*, which also forms part of coolant housing 70*d*. Apertures 81*d* through cooling tube inlet and outlet plates 78*d*, 82*d* correspond with and fluidly connect to inlets and outlets 76*d*, 80*d* of cooling tubes 68*d*. As such, raw gas may pass via cooling tubes 68*d* from raw gas inlet chamber 66*d* of heat exchanger 40*d* to the discharge end 46*d* (FIG. 3) of branch duct 28*d*.

The multiple parallel cooling tubes 68*d* in heat exchanger 40*d* channel and accelerate the flow of raw gas along the length thereof, thereby obtaining a relatively well-directed, uniform flow there through. The uniformity and speed of the raw gas flow results in a relatively low degree of scaling.

Each cooling tube 68*d* is provided with a cooling tube inlet funnel 77*d*, i.e. a widened cooling tube inlet, fixedly connected to cooling tube inlet plate 78d at aperture edges 83d, so as to extend into inlet chamber 66d. Inlet funnels 77d accelerate the flow of raw gas entering cooling tubes 68d, thereby further reducing the risk of scaling inside tubes 68d. Although inlet funnels 77d illustrated in FIG. 4 are conical in shape, inlet funnels 77d may be constructed in other shapes, such as for example, a bell-shape.

By positioning individual heat exchangers 40a-f (FIG. 1) in branch ducts 28a-f, each heat exchanger 40a-f may be designed for cooling a relatively small branch flow 38d of raw gas. Accordingly, heat exchangers 40a-f may be made relatively small in size while having suitable capacity to accommodate the intended reduced raw gas flow volume. Relatively small sized heat exchangers 40a-f may more easily share mounting structures, access platforms, lighting, inspection lids, etc., with other devices so positioned in connection with pot room 12AB (FIG. 1), such as common collection duct 26A and/or electrolytic cells 14a-f. Furthermore, the use of heat exchangers 40a-f at branch ducts 28a-f reduces the need for "back-up" heat exchangers, as compared to the alternative of a centrally located heat exchanger 36 (FIG. 1). The consequences for the operation of plant 10, in the event of a single malfunction at a branch duct heat exchanger 40a-f, are not significant in comparison to a malfunction of a relatively large centrally located heat exchanger 36 (FIG. 1).

Figure 5:
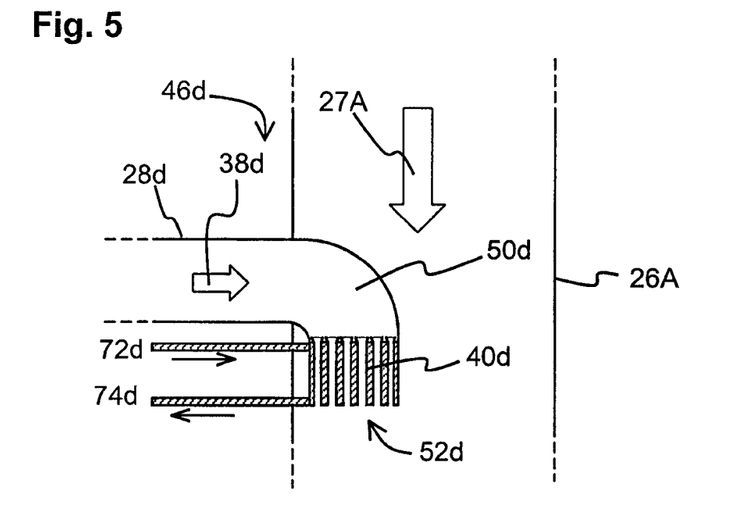
FIG. 5 is a schematic cross-section top view, of an alternative embodiment of a discharge end of a branch duct such as that illustrated in FIG. 2.

FIG. 5 illustrates an alternative embodiment of branch duct discharge end 46d, according to which heat exchanger 40d is located at discharge aperture 52d of branch duct 28d. Thereby, heat exchanger 40d may serve the triple functions of exchanging heat, generating flow resistance, and accelerating the flow of branch flow 38d into common collection duct 26A. Such reduces the need for a separate constriction at discharge aperture 52d, resulting in yet another means by which energy consumption by fan 34 may be reduced.

Figure 6:
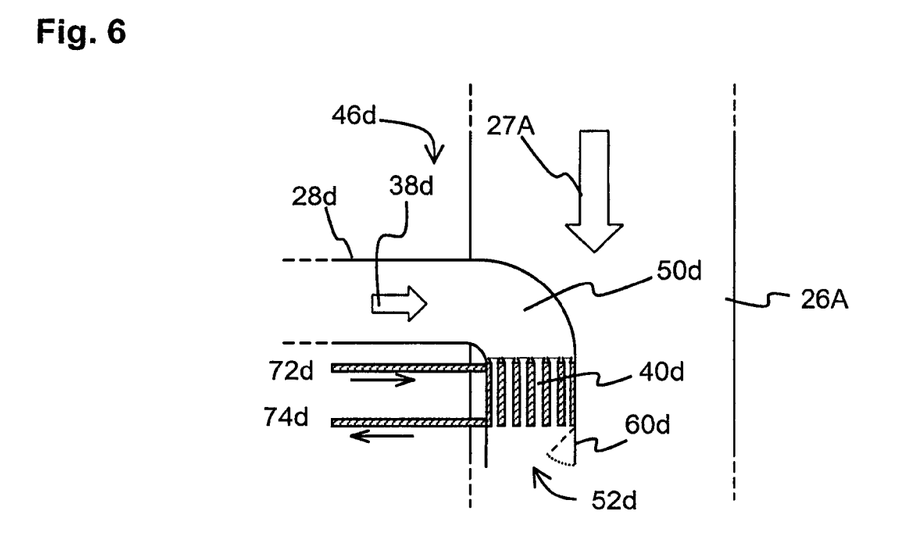
FIG. 6 is a schematic cross-section top view, of yet another alternative embodiment of a discharge end of a branch duct such as that illustrated in FIG. 2.

FIG. 6 illustrates an alternative embodiment, wherein an adjustable flap 60d at discharge aperture 52d allows for fine-tuning the acceleration of the branch flow 38d, as well as for fine-tuning the pressure drop in branch duct 28d.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

For example, a T-shaped header duct 32 has been described above. It will be appreciated that a header duct may have any shape, or, as an alternative to channeling the raw gas into the gas cleaning unit 22 via a header duct, each common collection duct 26 may be connected directly to a gas cleaning unit 22.

Furthermore, not all branch ducts 28 connected to a common collection duct 26 need to be provided with an alignment section 50d and/or a constriction 54d; providing only a plurality of the branch ducts 28 with an alignment section 50d and/or a constriction 54d is sufficient for obtaining a positive effect on the flow distribution and energy consumption.

Heat exchangers 40 need not be of the stacked tube type described herein; they may be of any type known to those skilled in the art.

It is not necessary that all branch ducts 28 near a common collection duct outlet 30 be provided with a respective heat exchanger 40 in order to obtain a suitable balancing of branch flows 38; as an exemplary alternative, a few selected branch ducts 28 may be provided with heat exchangers 40, and the pressure drop across the remaining branch ducts 28 may be controlled in any other manner, e.g., by means of a damper.

Branch duct heat exchangers 40a-f may be used for levelling the pressure in a common collection duct 26A regardless of the presence of any heat exchanger 36 in header duct 32.

The invention claimed is:

1. A raw gas collection system for collecting raw gas from a plurality of aluminium smelting pots, the raw gas collection system comprising:
   a common collection duct for channeling a common collection duct flow of raw gas in a common collection duct flow direction toward a gas cleaning unit with a suction fan arranged downstream of the gas cleaning unit;
   a plurality of branch ducts each having an inlet connected to a smelting pot for drawing a respective branch flow of raw gas therefrom, and a discharge end connected to the common collection duct, said discharge end equipped with an alignment section for aligning the respective branch flow with the direction of said common collection duct flow, an adjustable discharge aperture, and a constriction for accelerating the respective branch flow through the discharge aperture into the common collection duct;
   each of at least two branch ducts of said plurality of branch duct provided with a respective heat exchanger;
   each of at least two other branch ducts of said plurality of branch duct being without a heat exchanger;
   wherein said at least two branch ducts with heat exchangers are connected to the common collection duct downstream of said at least two other branch ducts without heat exchangers operable with balanced gas flow through each of the plurality of branch ducts; and
   each of said heat exchangers provided with a respective heat transfer element located in the respective branch flow for transferring heat from the respective branch flow of raw gas to a heat transfer medium, each respective heat transfer element being configured for generating a flow resistance in the respective branch duct to balance the branch flows of said at least two branch ducts.

2. The raw gas collection system according to claim 1, wherein the respective heat exchanger and constriction of said at least two branch ducts when in use generate at least 50% of a total raw gas pressure drop from the respective branch duct inlet to the discharge aperture.

3. The raw gas collection system according to claim 1, wherein the constriction in each of said at least two branch ducts is provided with an adjustable flap for controlling the acceleration of the respective branch flow into the common collection duct.

4. The raw gas collection system according to claim 1, wherein the heat transfer element of each of said at least two branch ducts is positioned at the discharge aperture.

5. The raw gas collection system according to claim 1, wherein at least one of said at least two branch ducts is provided with a respective regulation damper for fine-tuning flow resistance of the respective branch duct.

6. The raw gas collection system according to claim 1, wherein said at least two branch ducts comprise at least 30% of all branch ducts connected to said common collection duct.

7. The raw gas collection system according to claim 1, wherein the respective heat exchanger of each of said at least two branch ducts comprises a raw gas inlet chamber for receiving a branch flow of raw gas, and a plurality of mutually parallel, spaced apart, raw gas cooling tubes.

8. The raw gas collection system according to claim 7, wherein each raw gas cooling tube includes a cooling tube inlet funnel for accelerating raw gas into the cooling tube.

* * * * *